(12) United States Patent
Bonalle et al.

(10) Patent No.: US 9,811,832 B2
(45) Date of Patent: Nov. 7, 2017

(54) SYSTEM, METHOD, AND COMPUTER PROGRAM PRODUCT FOR ISSUING AND USING DEBIT CARDS

(71) Applicant: III Holdings 1, LLC, Wilmington, DE (US)

(72) Inventors: David S. Bonalle, New Rochelle, NY (US); Emily A. Chong, New York, NY (US); I-Hsin Chuang, Brooklyn, NY (US); Lauren E. Dardick, New York, NY (US); Jennifer A. Elwood, Chelsea Manor St (GB); William J. Gray, Peoria, AZ (US); David J. Wong, Oceanport, NJ (US)

(73) Assignee: III Holdings 1, LLC, Wilmington, DE (US)

( * ) Notice: Subject to any disclaimer, the term of this patent is extended or adjusted under 35 U.S.C. 154(b) by 0 days.

(21) Appl. No.: 15/134,225

(22) Filed: Apr. 20, 2016

(65) Prior Publication Data

US 2016/0314467 A1  Oct. 27, 2016

Related U.S. Application Data

(63) Continuation of application No. 14/563,992, filed on Dec. 8, 2014, now Pat. No. 9,324,077, which is a
(Continued)

(51) Int. Cl.
*G06K 5/00* (2006.01)
*G06Q 20/40* (2012.01)
(Continued)

(52) U.S. Cl.
CPC .......... *G06Q 20/409* (2013.01); *G06Q 20/04* (2013.01); *G06Q 20/26* (2013.01); *G06Q 20/34* (2013.01); *G06Q 20/40* (2013.01)

(58) Field of Classification Search
CPC ........ G06Q 20/04; G06Q 40/02; G06Q 20/10; G06Q 20/40; G06Q 20/102; G06Q 20/14;
(Continued)

(56) References Cited

U.S. PATENT DOCUMENTS 5,594,233 A * 1/1997 Kenneth ............. G06K 7/0004
                                                     235/487
5,689,100 A   11/1997 Carrithers et al.
(Continued)

OTHER PUBLICATIONS http://www.debitman.com, "Debitman's mission is to help merchants reduce their interchange costs.", 2006 Debitman Card, Inc., Last viewed: Sep. 28, 2006, 1 page.
(Continued)

*Primary Examiner* — Thien M Le
(74) *Attorney, Agent, or Firm* — Meyertons, Hood, Kivlin, Kowert & Goetzel, P.C.

(57) ABSTRACT

A system, method, and computer program product are used to issue and track debit cards. A system comprises an enrolling system that verifies an enrollee, associates an enrollee's main and overdraft account, and issues a debit card, an authentication system that receives information regarding a requested transaction of a debit card and that receives information regarding the main and overdraft account associated with the debit card and accepts or rejects the requested transaction based thereon, and a settlement system that generates a periodic report of at least one of the transactions, the main account, and the overdraft account. The overdraft account can be a charge or credit account.

14 Claims, 13 Drawing Sheets

Related U.S. Application Data continuation of application No. 12/907,955, filed on Oct. 19, 2010, now Pat. No. 8,905,301, which is a continuation of application No. 11/478,140, filed on Jun. 30, 2006, now Pat. No. 7,837,100.

(60) Provisional application No. 60/695,855, filed on Jul. 5, 2005.

(51) Int. Cl.
*G06Q 20/04* (2012.01)
*G06Q 20/26* (2012.01)
*G06Q 20/34* (2012.01)

(58) Field of Classification Search
CPC ...... G06Q 20/20; G06Q 20/204; G06Q 20/26; G06Q 20/34; G06Q 20/409; G06Q 30/02; G06Q 20/027; G06Q 20/105; G06Q 20/207
USPC .................................................. 235/379, 380
See application file for complete search history.

(56) References Cited

U.S. PATENT DOCUMENTS

| | | | |
|---|---|---|---|
| 6,038,552 A | 3/2000 | Fleischl et al. | |
| 6,189,785 B1 | 2/2001 | Lowery | |
| 6,267,292 B1 | 7/2001 | Walker et al. | |
| 6,374,231 B1 | 4/2002 | Bent et al. | |
| 6,578,761 B1 | 6/2003 | Spector | |
| 6,609,113 B1 | 8/2003 | O'Leary et al. | |
| 6,615,189 B1 | 9/2003 | Phillips et al. | |
| 6,681,988 B2 | 1/2004 | Stack et al. | |
| 6,757,664 B1 | 6/2004 | Cardinal et al. | |
| 6,786,400 B1 | 9/2004 | Bucci | |
| 6,892,187 B2 | 5/2005 | Phillips et al. | |
| 7,104,443 B1 | 9/2006 | Paul et al. | |
| 7,296,734 B2 | 11/2007 | Pliha | |
| 7,685,067 B1 | 3/2010 | Britto et al. | |
| 7,752,132 B2 | 7/2010 | Stewart et al. | |
| 7,774,275 B2* | 8/2010 | Jung .................. | G06Q 10/0635 705/38 |
| 2002/0016769 A1 | 2/2002 | Barbara et al. | |
| 2002/0093426 A1* | 7/2002 | Jackson ............... | G06K 7/0008 340/572.7 |
| 2003/0105710 A1 | 6/2003 | Barbara et al. | |
| 2005/0091524 A1 | 4/2005 | Abe et al. | |
| 2005/0246289 A1 | 11/2005 | Alexander et al. | |
| 2006/0271456 A1 | 11/2006 | Romain et al. | |
| 2007/0168274 A1 | 7/2007 | Taylor | |
| 2007/0175982 A1 | 8/2007 | Bonalle et al. | |
| 2007/0198404 A1 | 8/2007 | Hirka et al. | |
| 2009/0090783 A1 | 4/2009 | Killian et al. | |
| 2009/0106158 A1* | 4/2009 | Hill ....................... | G06Q 20/04 705/66 |
| 2009/0287565 A1 | 11/2009 | Bishop et al. | |
| 2009/0299841 A1 | 12/2009 | Bishop et al. | |
| 2009/0313108 A1* | 12/2009 | Cooper ................. | G06Q 20/10 705/14.27 |
| 2010/0191587 A1 | 7/2010 | Duerr | |
| 2010/0264227 A1 | 10/2010 | Joyce | |
| 2011/0060687 A1 | 3/2011 | Bonalle et al. | |
| 2011/0276420 A1* | 11/2011 | White .................. | G06Q 20/105 705/17 |
| 2012/0203689 A1* | 8/2012 | Parvis ................... | G06Q 40/00 705/39 |
| 2013/0282464 A1* | 10/2013 | Bradley ............... | G06Q 20/227 705/14.27 |

OTHER PUBLICATIONS

Office Action in U.S. Appl. No. 14/563,992 dated Jul. 31, 2015, 21 pages.
Office Action in U.S. Appl. No. 12/907,955 dated Nov. 19, 2013, 11 pages.
Office Action in U.S. Appl. No. 12/907,955 dated Dec. 24, 2013, 9 pages.
Office Action in U.S. Appl. No. 11/478,140 dated Jul. 27, 2009, 6 pages
Office Action in U.S. Appl. No. 11/478,140 dated Dec. 16, 2009, 7 pages.

* cited by examiner

SYSTEM, METHOD, AND COMPUTER PROGRAM PRODUCT FOR ISSUING AND USING DEBIT CARDS

CROSS REFERENCE TO RELATED APPLICATIONS

The present application is a continuation of U.S. application Ser. No. 14/563,992, filed Dec. 8, 2014 (now U.S. Pat. No. 9,324,077), which is a continuation of U.S. application Ser. No. 12/907,955, filed Oct. 19, 2010 (now U.S. Pat. No. 8,905,301), which is a continuation of U.S. application Ser. No. 11/478,140, filed Jun. 30, 2006 (now U.S. Pat. No. 7,837,100), which claims priority to U.S. Provisional Appl. No. 60/695,855, filed Jul. 5, 2005; the disclosures of each of the above-referenced applications are incorporated by reference herein in their entireties.

BACKGROUND

Field of the Invention

The present invention generally relates to debit cards.

Related Art

In the market today, more people are opting for prepaid cards (e.g., debit cards, stored value cards, etc.) as a means of limiting or monitoring their spending, rather than using more traditional credit or charge cards which can carry interest charges if the total amount charged on such cards are not repaid within a specified period of time (e.g., 30 days). Unfortunately, a credit and charge card account company may not be able to enter into this market because they do not operate a bank which offers demand deposit account services. Thus, it is not unexpected to find that banks which issue charge and credit cards appear to be dominating the prepaid card market.

Given the foregoing, what is needed is a system, method and computer program product for allowing companies that do not have the ability to offer consumers banking-type deposit accounts to issue pre-paid/debit-type cards to their customers.

BRIEF DESCRIPTION

The present invention meets the above-identified needs by providing a system, method and computer program product for allowing debit cards to be issued to customers by companies who do not have traditional bank-type operations, and thus do not offer, or do not widely offer, demand deposit accounts.

In one embodiment, a method is provided comprising: enrolling in a debit card program, associating an account to the debit card, associating an overdraft account (e.g., a charge or credit card) to the debit card, authenticating a transaction requested by the debit card against at least one of the account or the overdraft account, updating information regarding at least one of the account or the overdraft account based on the transaction, and providing a periodic output of the account information for the account and the overdraft account.

In another embodiment, a system comprises an enrolling system, an authentication system, and a settlement system. The enrolling system verifies an enrollee, associates an enrollee's main and overdraft account, and issues a debit card. The authentication system receives information regarding a requested transaction of a debit card, receives information regarding the main and overdraft account associated with the debit card, and accepts or rejects the requested transaction based thereon. The settlement system generates a periodic report of at least one of the transactions, the main account, and the overdraft account. The overdraft account can be a charge or credit account.

Further features and advantages of the present invention as well as the structure and operation of various embodiments of the present invention are described in detail below with reference to the accompanying drawings.

BRIEF DESCRIPTION OF THE DRAWINGS

The features and advantages of the present invention will become more apparent from the detailed description set forth below when taken in conjunction with the drawings. The left-most digit of a reference number identifies the drawing in which the reference number first appears.

DETAILED DESCRIPTION

Figure 1:
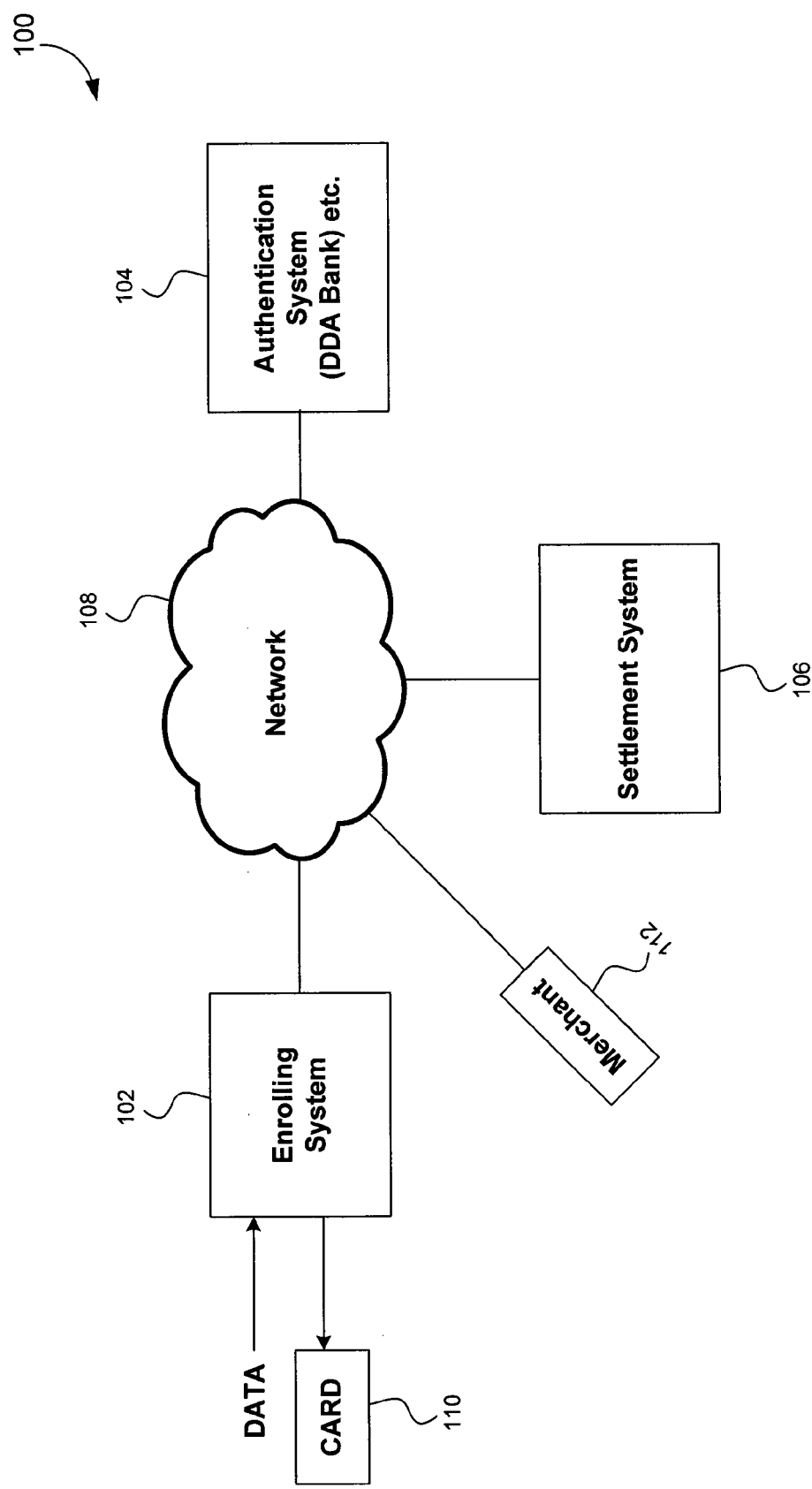
FIG. 1 is a system diagram.

Some acronyms used throughout this description are shown in the Table 1 below.

TABLE 1

| | |
|---|---|
| DDA | Demand Deposit Account (e.g., checking account) |
| ACH | Automated Clearing House (e.g., electronic funds transfer system that handles settlement of transactions to DDAs - sample application: direct deposit of paychecks) |
| CCSG | Consumer Card Services Group (e.g., of the issuer) |
| TCPS | Travelers Check and Prepaid Services (e.g., an issuer business unit that issues travelers checks and prepaid products (e.g., gift cards)) |
| Reg. Z | Federal Reserve System Regulation Z (Truth in Lending - governs issuance of credit cards) |
| Reg. E | Federal Reserve System Regulation E (Electronic Fund Transfers - governs issuance of debit cards) |
| BAU | Business as Usual (e.g., status quo) |
| CAS | Card Authorization System (e.g., an issuer system that authorizes point of sale transactions) |
| CMs (CM) | Card Member (i.e., the debit card issuer's customer) |
| TSC Rep | Telephone Service Center (e.g. customer service representative - also know as CSR) |

TABLE 1-continued

| | |
|---|---|
| GES | Global Establishment Services (e.g., an issuer business unit that establishes and maintains relationships with merchants for card acceptance) |
| WWCAS | Worldwide Card Authorization System (see CAS) |
| Xref | Cross Reference |
| NSF | Non Sufficient Funds (e.g., bounced check) |
| MICR (code) | Magnetic Ink Character Recognition (the numbers at the bottom of a paper check that define a DDA number and bank routing information) |
| OICR | Optical Ink Character Recognition |

I. Overview and Terminology

The embodiment(s) described, and references in the specification to "one embodiment", "an embodiment", "an example embodiment", etc., indicate that the embodiment(s) described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is understood that it is within the knowledge of one skilled in the art to effect such feature, structure, or characteristic in connection with other embodiments whether or not explicitly described.

The present invention is directed to a system, method and computer program product for issuing a debit-type card product in situations where the issuer does not offer, or does not widely offer, demand deposit accounts to consumers.

The debit product may be a debit card that will allow an issuer to launch a product targeting debit card users. Customers will be issued a new card product that will enable them to make purchases at all merchants that accept the issuer's other more traditional charge and/or credit cards. In one example, at the conclusion of each day purchases made on this product will be deducted from a card member specified DDA via ACH. The issuer will transmit an itemized list of transactions along with the purchase amounts via ACH to the linked DDA for inclusion in detailed statement by the DDA bank. Should transactions sent via ACH to the linked DDA be rejected due to non-sufficient funds, those purchases will be transferred to the customer's existing credit or charge account previously associated with the debit card. Transferred purchases may accrue interest and/or be charged a convenience fee under the terms of the agreement of the customer's credit/charge account with the issuer. The issuer will ensure on a periodic or per transaction basis that the customer's linked DDA is in good standing. The issuer will contract with external vendors, such as, for example, eFunds Corporation of Scottsdale, Ariz., to validate the DDA and ensure that the account is in good standing.

Additionally, or alternatively, in order to verify funds availability, the issuer may utilize data extracted from the online banking services of the customer's DDA. The card member must provide consent and the appropriate username and password to sign into the online banking services of the linked DDA for the purposes of obtaining available balance and transaction history. Purchases transacted on the debit card will be interrogated against the balance of the linked DDA. If the DDA balance exceeds the value of the card member purchase, the transaction will be approved. The transaction value deducted from the available balance may be provided to the card member to indicate their "line of credit." The DDA balance may also be provided to the customer as part of an ATM cash withdrawal transaction conducted with the debit card of the present invention. In one example, the issuer can use an external vendor, such as, for example, Yodlee, Inc., of Redwood City, Calif., to provide account aggregation services that could facilitate the extraction of customer data from non-issuer bank accounts.

Additionally, or alternatively, the debit card can be initially targeted at the issuer's existing card members. The existing credit/charge relationship may be utilized as a line of credit for all transactions that are rejected or returned by the card member's DDA during periodic (e.g., daily) "ACH sweeps."

In one example, customers of the debit card product will accrue points towards a loyalty program, such as the American Express Membership Rewards, Delta SkyMiles, Hilton HHonors, Starwood Points, Discover Cashback Bonus, or the like. Points accrued via this product may be aggregated to an existing loyalty program account. In lieu of points, the issuer may offer cash back on purchases as an incentive.

In one example, this product can be open to all customers with established DDAs, including asset managed investment and retirement accounts.

The terms "member," "card member," "user," "end user", "consumer", "customer," "participant," etc., and/or the plural form of these terms are used interchangeably throughout herein to refer to those persons or entities capable of accessing, using, being affected by and/or benefiting from the tool that the present invention provides for searching credit reports using only a partial social security number and other identifying information.

Furthermore, the terms "business" or "merchant" may be used interchangeably with each other and shall mean any person, entity, distributor system, software and/or hardware that is a provider, broker and/or any other entity in the distribution chain of goods or services. For example, a merchant may be a grocery store, a retail store, a travel agency, a service provider, an on-line merchant or the like.

Transaction Accounts and Instrument

A "transaction account" as used herein refers to an account associated with an open account or a closed account system (as described below). The transaction account may exist in a physical or non-physical embodiment. For example, a transaction account may be distributed in non-physical embodiments such as an account number, frequent-flyer account, and telephone calling account or the like. Furthermore, a physical embodiment of a transaction account may be distributed as a financial instrument.

A financial transaction instrument may be traditional plastic transaction cards, titanium-containing, or other metal-containing, transaction cards, clear and/or translucent transaction cards, foldable or otherwise unconventionally-sized transaction cards, radio-frequency enabled transaction cards, or other types of transaction cards, such as credit, charge, debit, pre-paid or stored-value cards, or any other like financial transaction instrument. A financial transaction instrument may also have electronic functionality provided by a network of electronic circuitry that is printed or otherwise incorporated onto or within the transaction instrument (and typically referred to as a "smart card"), or be a fob having a transponder and an RFID reader.

Open Versus Closed Cards

"Open cards" are financial transaction cards that are generally accepted at different merchants. Examples of open cards include the American Express®, Visa®, MasterCard® and Discover® cards, which may be used at many different retailers and other businesses. In contrast, "closed cards" are financial transaction cards that may be restricted to use in a particular store, a particular chain of stores or a collection of affiliated stores. One example of a closed card is a pre-paid gift card that may only be purchased at, and only be accepted at, a clothing retailer, such as The Gap® store.

Stored Value Cards

Stored value cards are forms of transaction instruments associated with transaction accounts, wherein the stored value cards provide cash equivalent value that may be used within an existing payment/transaction infrastructure. Stored value cards are frequently referred to as gift, pre-paid or cash cards, in that money is deposited in the account associated with the card before use of the card is allowed. For example, if a customer deposits ten dollars of value into the account associated with the stored value card, the card may only be used for payments up to ten dollars.

Use of Transaction Accounts

With regard to use of a transaction account, users may communicate with merchants in person (e.g., at the box office), telephonically, or electronically (e.g., from a user computer via the Internet). During the interaction, the merchant may offer goods and/or services to the user. The merchant may also offer the user the option of paying for the goods and/or services using any number of available transaction accounts. Furthermore, the transaction accounts may be used by the merchant as a form of identification of the user. The merchant may have a computing unit implemented in the form of a computer-server, although other implementations are possible.

In general, transaction accounts may be used for transactions between the user and merchant through any suitable communication means, such as, for example, a telephone network, intranet, the global, public Internet, a point of interaction device (e.g., a point of sale (POS) device, personal digital assistant (PDA), mobile telephone, kiosk, etc.), online communications, off-line communications, wireless communications, and/or the like.

Account and Merchant Numbers

An "account," "account number" or "account code", as used herein, may include any device, code, number, letter, symbol, digital certificate, smart chip, digital signal, analog signal, biometric or other identifier/indicia suitably configured to allow a consumer to access, interact with or communicate with a financial transaction system. The account number may optionally be located on or associated with any financial transaction instrument (e.g., rewards, charge, credit, debit, prepaid, telephone, embossed, smart, magnetic stripe, bar code, transponder or radio frequency card).

The account number may be distributed and stored in any form of plastic, electronic, magnetic, radio frequency (RF), wireless, audio and/or optical device capable of transmitting or downloading data from itself to a second device. A customer account number may be, for example, a sixteen-digit credit card number. Each credit card issuer has its own numbering system, such as the fifteen-digit numbering system used by American Express Company of New York, N.Y. Each issuer's credit card numbers comply with that company's standardized format such that an issuer using a sixteen-digit format will generally use four spaced sets of numbers in the form of:

$N_1N_2N_3N_4\ N_5N_6N_7N_8\ N_9N_{10}N_{11}N_{12}\ N_{13}N_{14}N_{15}N_{16}$

The first five to seven digits are reserved for processing purposes and identify the issuing institution, card type, etc. In this example, the last (sixteenth) digit is typically used as a sum check for the sixteen-digit number. The intermediary eight-to-ten digits are used to uniquely identify the customer, card holder or card member.

A merchant account number may be, for example, any number or alpha-numeric characters that identifies a particular merchant for purposes of card acceptance, account reconciliation, reporting and the like.

RFID and Transmission of Magnetic Stripe Data

It should be noted that the transfer of information in accordance with the present invention, may be done in a format recognizable by a merchant system or account issuer. In that regard, by way of example, the information may be transmitted from an RFID device to an RFID reader or from the RFID reader to the merchant system in magnetic stripe or multi-track magnetic stripe format.

Because of the proliferation of devices using magnetic stripe format, the standards for coding information in magnetic stripe format were standardized by the International Organization for Standardization in ISO/IEC 7811-n (characteristics for identification cards) which are incorporated herein by reference. The ISO/IEC 7811 standards specify the conditions for conformance, physical characteristics for the card (warpage and surface distortions) and the magnetic stripe area (location, height and surface profile, roughness, adhesion, wear and resistance to chemicals), the signal amplitude performance characteristics of the magnetic stripe, the encoding specification including technique (MFM), angle of recording, bit density, flux transition spacing variation and signal amplitude, the data structure including track format, use of error correction techniques, user data capacity for ID-1, ID-2 and ID-3 size cards, and decoding techniques, and the location of encoded tracks.

Typically, magnetic stripe information is formatted in three tracks. Certain industry information must be maintained on certain portions of the tracks, while other portions of the tracks may have open data fields. The contents of each track and the formatting of the information provided to each track is controlled by the ISO/IEC 7811 standard. For example, the information must typically be encoded in binary. Track 1 is usually encoded with user information (i.e., name) in alphanumeric format. Track 2 is typically comprised of discretionary and nondiscretionary data fields. In one example, the nondiscretionary field may comprise 19 characters and the discretionary field may comprise 13 characters. Track 3 is typically reserved for financial transactions and includes enciphered versions of the user's personal identification number, country code, current units amount authorized per cycle, subsidiary accounts, and restrictions.

As such, where information is provided in accordance with the present invention, it may be provided in magnetic stripe track format. For example, the counter values, authentication tags and encrypted identifiers, described herein, may be forwarded encoded in all or a portion of a data stream representing data encoded in, for example, track 2 or track 3 format.

System Overview

FIG. 1 shows a system 100. System 100 includes an enrolling system 102, an authentication system 104, and a settlement system 106, which can all be coupled via a network 108 (e.g., a wired or wireless internet, intranet, etc.). Customers wanting to use a debit card program of an issuer enter information or data into enrolling system 102. This information can be, but is not limited to, personal, financial, biographical, biometrical, etc. information. The information is transmitted via network 108 (or directly in some examples) to authentication system 104. Authentication system 104 can be operated and positioned as an issuing company's system or can be a third party system, in various examples. Once the person's identity has been verified and financial information has been accepted, one or more accounts (e.g., main and overdraft, DDA, etc.) of the person are associated with a debit card 110.

Customers are then issued a debit card 110 for enabling purchases at all merchants 112 that accept debit card 110. In one example, at the end of each business day, purchases made with the debit card 110 are deducted from the customer's specified DDA via the ACH. The card issuer maintains an itemized list of transactions along with purchase amounts and transmits this information through the ACH to the DDA bank 104, which may use this information for creating detailed statements.

Additionally, or alternatively, for each transaction, fund availability may be verified, for example using authentication system 104. In one example, this may be accomplished using data extracted from online banking services of the customer's DDA bank 104. The customer provides consent and an appropriate user name/password for allowing the card issuer to sign into the online banking services of the DDA bank 104 for the purposes of obtaining available balance and transaction history. In one example, purchases transacted on the debit card 110 are interrogated against the balance of the linked DDA. If the DDA balance exceeds the value of the purchase, the transaction is approved. The transaction value deducted from the available balance may be provided to the customer to indicate their "line of credit." The card issuer may contract with third party service providers to provide account aggregation services that can facilitate the extraction of customer data from non-card issuer bank accounts.

In the event that the value of the purchase exceeds the DDA balance, the debit card 110 uses an overdraw feature. The purchase is then be transferred to a customer's existing credit or charge account that has been designated for use as an overdraft account. Alternatively, transferred purchases may accrue interest under the terms of the agreement of the customer's credit or charge account with the card issuer. Additionally, the card issuer may ensure on a periodic or per transaction basis that the customer's linked DDA is in good standing. This may be accomplished through the use of external vendors, such as eFunds, to validate account standing.

The debit card 110 allows the card issuer the ability to offer an additional revenue generating product to customers who prefer to use debit cards. The debit card 110 also allows the card issuer the ability to offer a debit product to an existing customer without having to offer the customer a DDA because the debit card is linked to the customer's existing DDA. The debit card 110 may be offered to all customers with established DDA's including asset managed investment accounts and retirement accounts.

Process Overview

Figure 2:
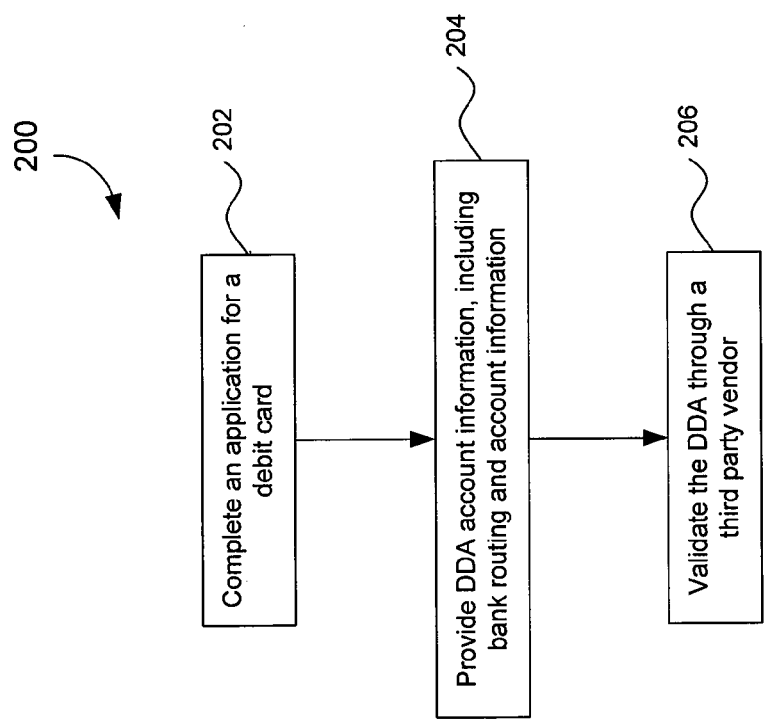
FIG. 2 shows a flowchart depicting a debit card application method.

FIG. 2 shows a flowchart depicting a debit card application method 200. In step 202, an application for a debit card is transmitted to a card issuing company. In step 204, DDA information is provided by the applicant, which can include, e.g., bank routing and account information. In step 206, the DDA information is validated through a third party vendor, which can be done to ensure the accuracy of data provided and that the account is in good standing. The DDA information could also be utilized for cash withdrawals at ATMs.

In one example, the debit card application method can include disclosures for extension of credit (Reg. Z) and daily direct debit from an existing DDA (Reg. E).

Figure 3:
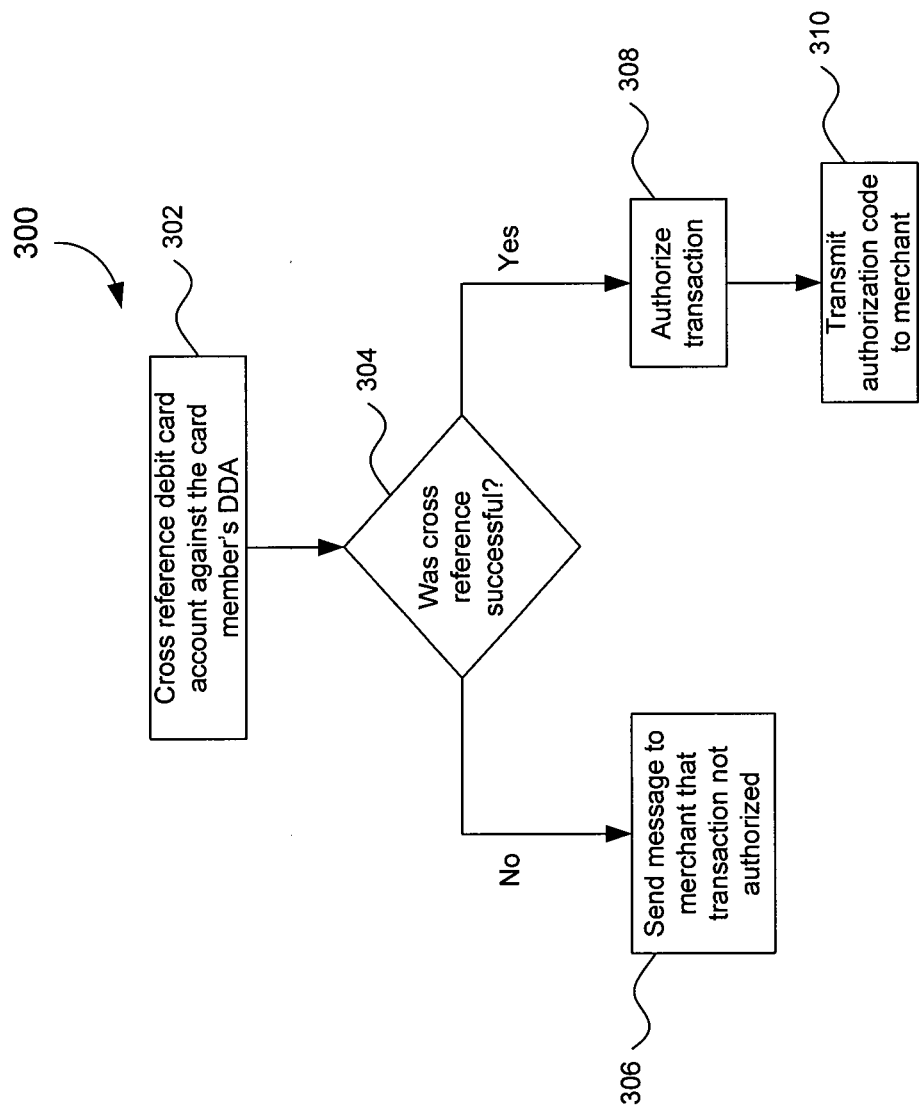
FIG. 3 shows a flowchart depicting a transaction processing method.

FIG. 3 shows a flowchart depicting a transaction processing method 300. In step 302, debit card account information captured at a merchant, e.g., either POS or via a network, is cross referenced against the card member's DDA. In step 304, a determination is made whether the cross reference was successful. If no, in step 306 a message is sent to the merchant that the transaction was not authorized. If yes, in step 308 the transaction is authorized. In step 310, an authorization code is transmitted to the merchant.

In one example, transactions are processed and authorized through CAS. The CAS cross references the debit card account against the card member's DDA. Similar to a paper check transaction, the authorization process may call a third-party vendor (e.g., eFunds or First Data Corporation of Greenwood Village, Colo.) to validate that the DDA is in good standing. Once the DDA is verified, the transaction is authorized by the CAS after which the authorization code is sent back to the merchant BAU. The process can include signature based authentication, transactions transmitted BAU, and verification.

Figure 4:
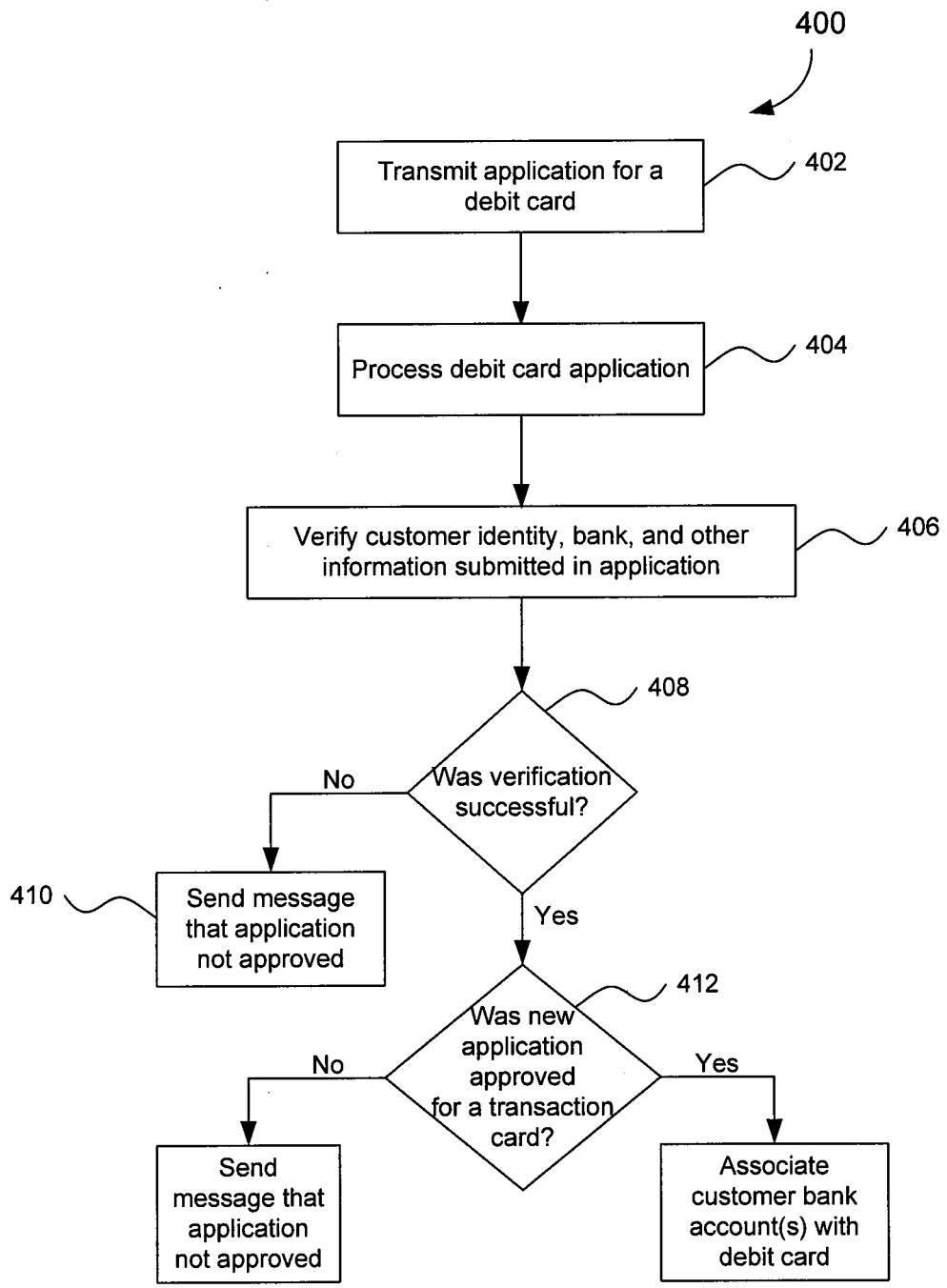
FIG. 4 shows a flowchart depicting an enrollment method.

FIG. 4 shows a flowchart depicting an enrollment method 400. In step 402, an application for a debit card is transmitted to a card issuing company. In step 404, the debit card application is processed. In step 406, the applicant's identity, bank, and other information submitted in the application are verified. In step 408, a determination is made whether the verification was successful. If no, in step 410 a message is sent that the application was not approved. If yes, in step 412, a determination is made whether the new application should be accepted. If no, in step 414 a message is sent to the applicant that the application has been declined. If yes, in step 416 the applicant's bank accounts are associated with the debit card.

Figure 5:
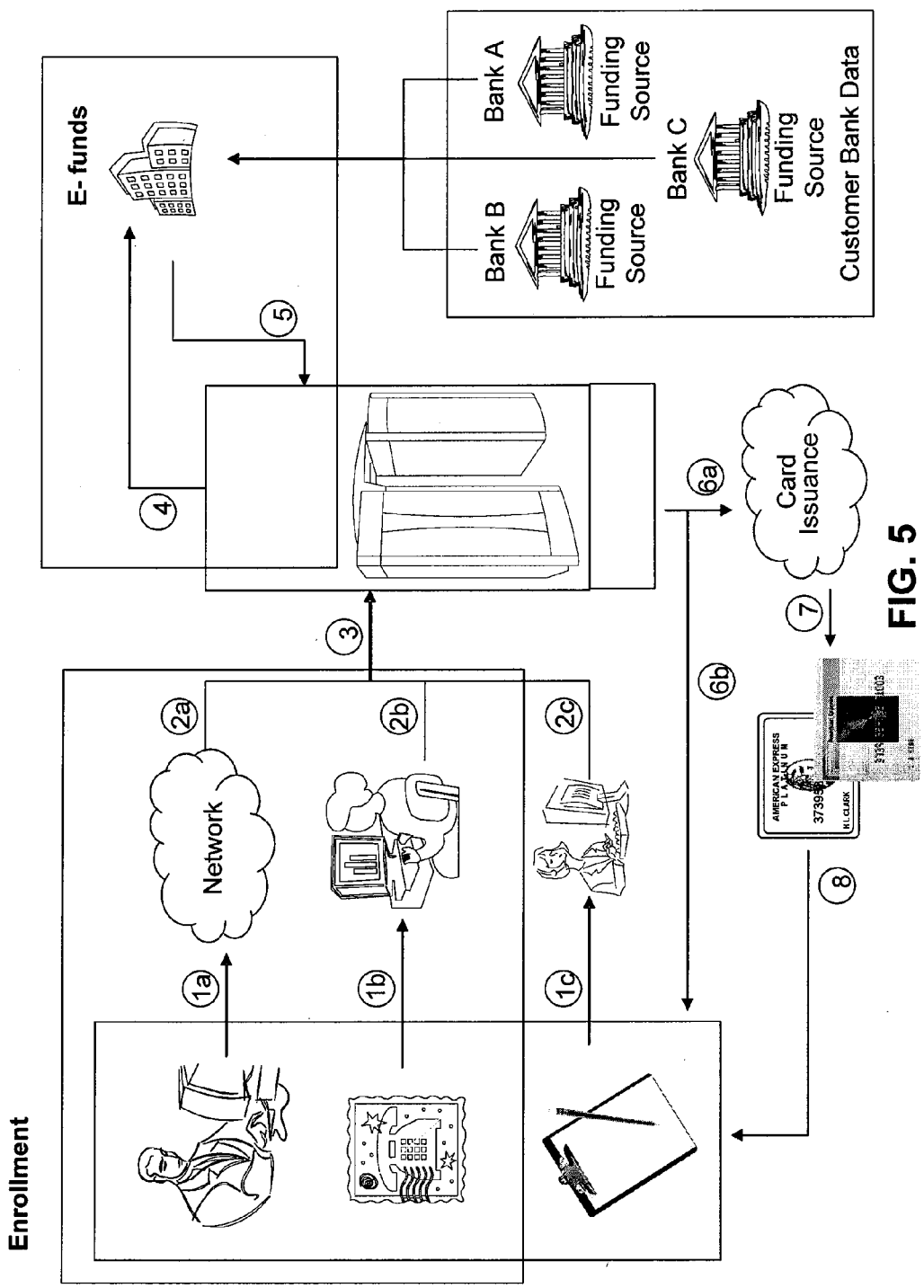
FIG. 5 pictorially shows an enrollment process.

FIG. 5 pictorially shows an enrollment process 500. In this system and process, in steps 1*a*, 1*b*, and 1*c*, respectively, a customer applies for a debit card via the web, telephone or through a paper application. The application information is received by a respective entity of an issuing card company (e.g., Internet, TSC representative, or a data entry representative) who in respective steps 2*a*, 2*b*, and 2*c* transmit the information to a new account processing portion 3. In step 4, an issuer or third party verification is performed on this information via customer bank data, and results are returned in step 5. If approved, in steps 6*a*, 7, and 8, customer accounts are associated with a debit card, which is mailed to the customer. If denied, in step 6*b* the customer is alerted of the denial.

Figure 6:
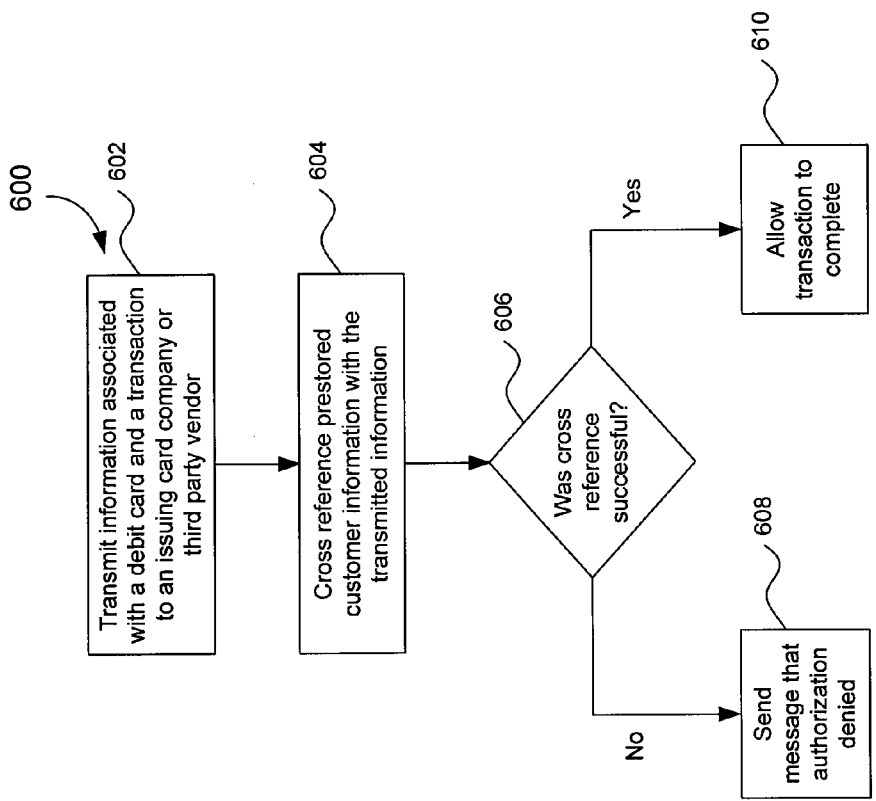
FIG. 6 shows a flowchart depicting a transaction authorization method.

FIG. 6 shows a flowchart depicting a transaction processing method 600. In step 602, information associated with a debit card and a transaction is transmitted to an issuing card company or third party vendor. In step 604, a cross reference is made between pre-stored customer information and the transmitted information. In step 606, a decision is made whether the cross-reference was successful. If no, in step 608 a message that authorization is denied is sent to the customer/merchant. If yes, in step 610 the transaction is allowed to be completed.

Figure 7:
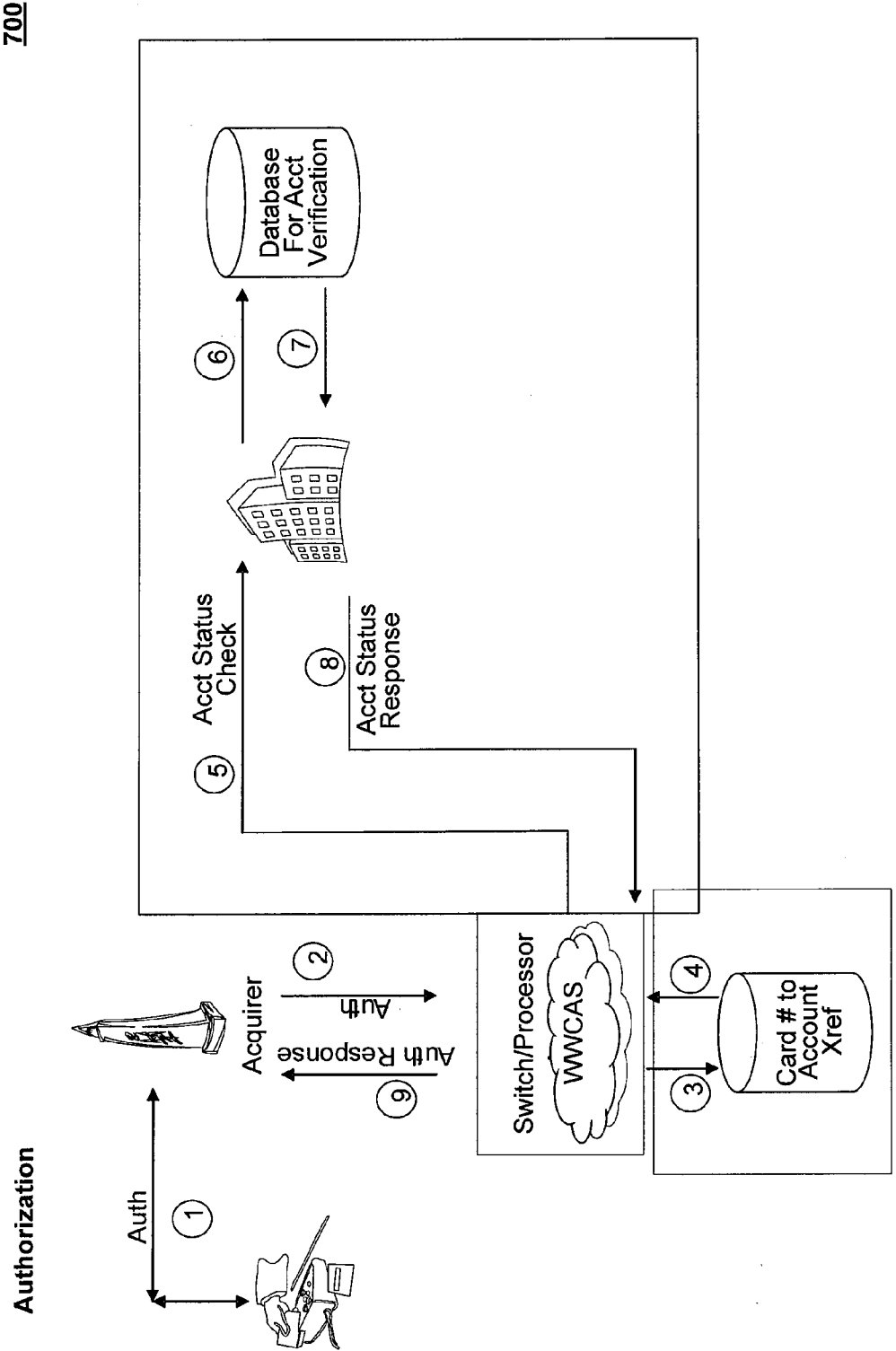
FIG. 7 pictorially shows a transaction authorization process.

FIG. 7 pictorially shows a transaction authorization process 700. In step 1, the debit card information is received at a merchant, and an authorization process begins. The authorization process starts through a communication between the merchant and a card issuer system (e.g., Amex-GES). In step 2, the card issuer system is notified of the requested transaction. In steps 3 and 4, the customer's information stored in a database is cross referenced. In steps 5, 6, 7, and 8 an account status is retrieved. In one example, the account status is retrieved by a card issuer or third party system verifying the information using information stored in another database. In step 9, if verification is successful, the requested transaction is allowed to occur and the transaction is completed.

In one example, authorization is performed in method 600 and/or 700 using an enrollment-Fraud Assessment system and method, in which a neutral-network decision model predicts likelihood of fraud. This determines Identity Information Validation, which means the applicant is who they say they are. This can be done using Predictive Scoring using a logistic scoring model. The following information, for example, can be used for the authorization: Thomson MICR* ID, Unpaid NSF checks written to retailers, Account status of serious unpaid NSF accounts, Closed account references from Multiple sources, Private/Shared velocity of all consumers as MICR funding activity on the Internet, OICR validation of known financial services companies that use ACH, Name/MICR Association from Debit Bureau, Convenience Check Analysis. MICR Code is a nine-digit number that helps in sorting checks, and also helps in uniquely identifying a branch of any given bank in any given city.

Figure 8:
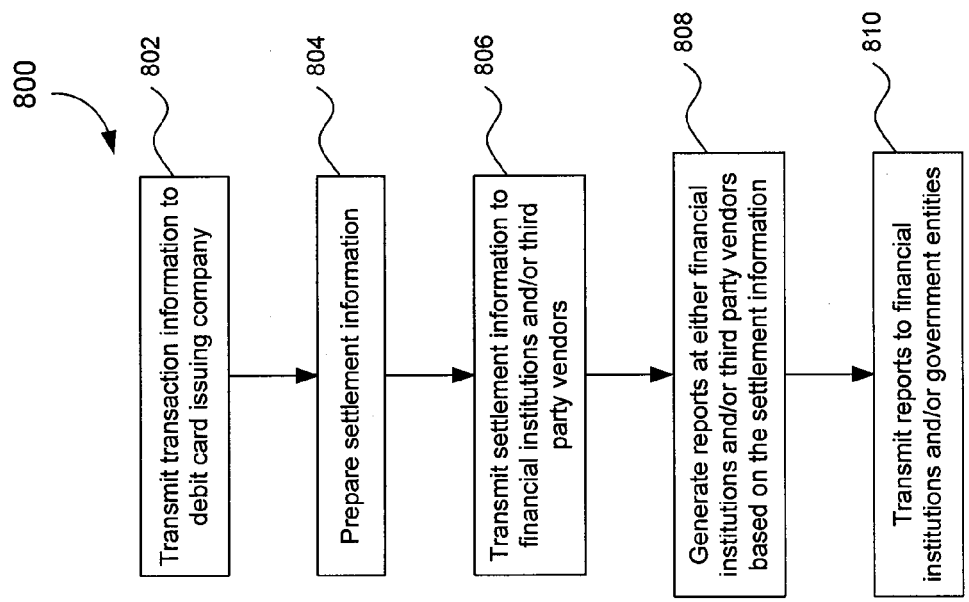
FIG. 8 shows a flowchart depicting a settlement method.

FIG. 8 shows a flowchart depicting a settlement method 800. In step 802, transaction information is transmitted to a debit card issuing company. In step 804, settlement information is prepared. In step 806, the settlement information is transmitted to financial institutions and/or third party vendors. In step 808, reports are generated at either the financial institutions and/or the third party vendors based on the settlement information. In step 810, the reports are transmitted to other financial institutions and/or governmental entities.

Figure 9:
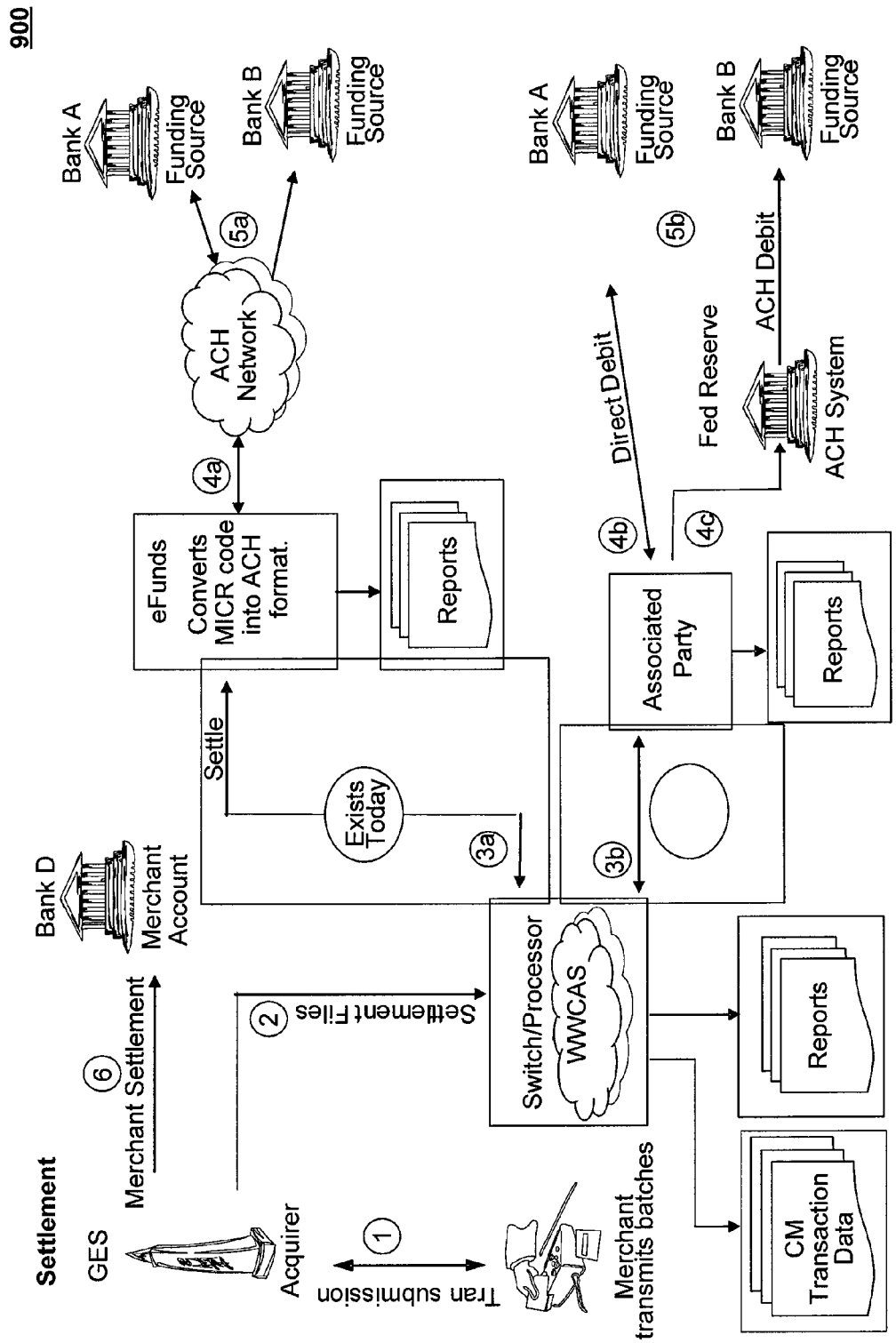
FIG. 9 pictorially shows a settlement process.

FIG. 9 pictorially shows a settlement process 900. In step 1, a transaction is submitted to a debit card issuing company. In step 2, settlement files are generated and transmitted by the card issuing company to a network switch or processor. In one example, the settlement files can include information that is used to prepare CM transaction data and other reports via the card issuer WWCAS.

In one example, in step 3a, the settlement files and associated data are transmitted via the card issuer WWCAS to a third party vendor, for example eFunds. Additionally, or alternatively, the third party vendor can process the received information, for example by converting MICR code in ACH format. In step 4a, a connection to an ACH network is established that allows for transmission and receipt of information relating to the CM transaction data and the other reports. In step 5a, a connection between the ACH network and one or more funding sources (e.g., banks) is established that allows for transmission and receipt of information corresponding to the CM transaction data and the other reports.

Additionally, or alternatively, in step 3b, a connection is established between the card issuer WWCAS and an Associated Party. In process 4b, a connection is established between the Associated Party and a funding source, and additionally or alternatively, in process 4c a connection is established between the Associated Party and a funding source via an ACH system (e.g., the Federal Reserve). The connection(s) are used to transmit and received information associated with the settlement files and associated information. The received information can be used by the Associated Party to generate reports.

Figure 10:
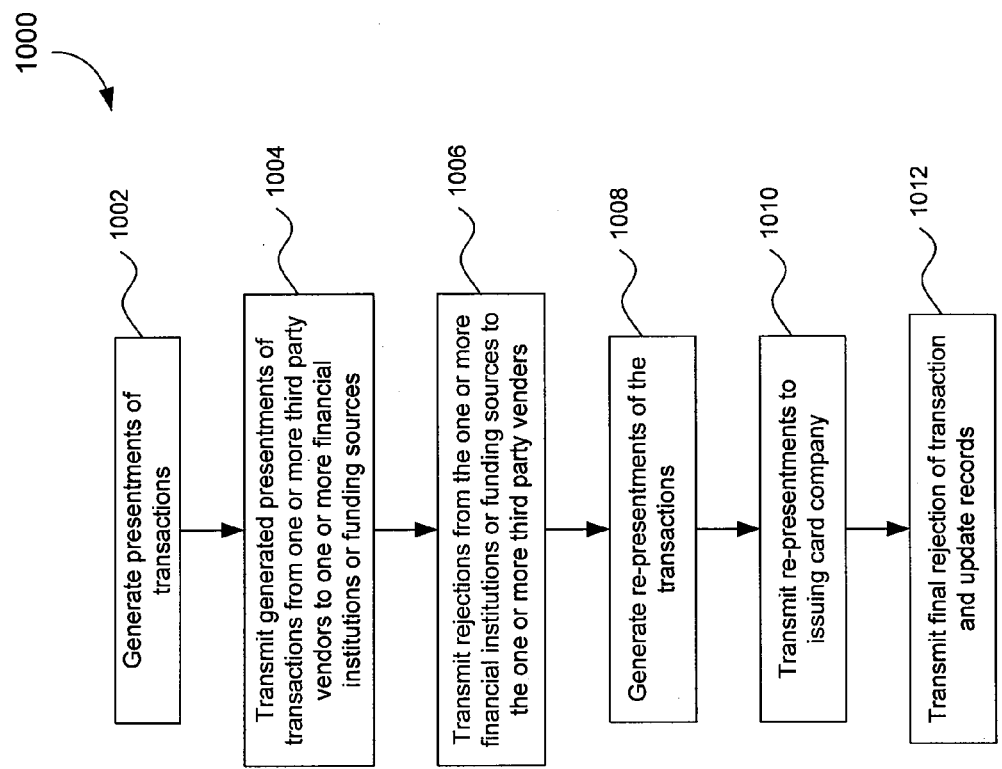
FIG. 10 shows a flowchart depicting a transaction rejection method.

FIG. 10 shows a flowchart depicting a transaction rejection method 1000 of a requested transaction. In step 1002, presentments of transactions are generated. In step 1004, the generated presentments of transactions are transmitted from one or more third party vendors to one or more financial institutions or funding sources. In step 1006, rejections of the presented transactions are transmitted from the one or more financial institutions or funding sources to the one or more third party vendors. In step 1008, re-presentments of the transactions are generated. In step 1010, the re-presentments of the transactions are transmitted to an issuing card company. In step 1012, final rejections of the re-presented transactions are transmitted and associated records (e.g., electronic records) are updated.

Figure 11:
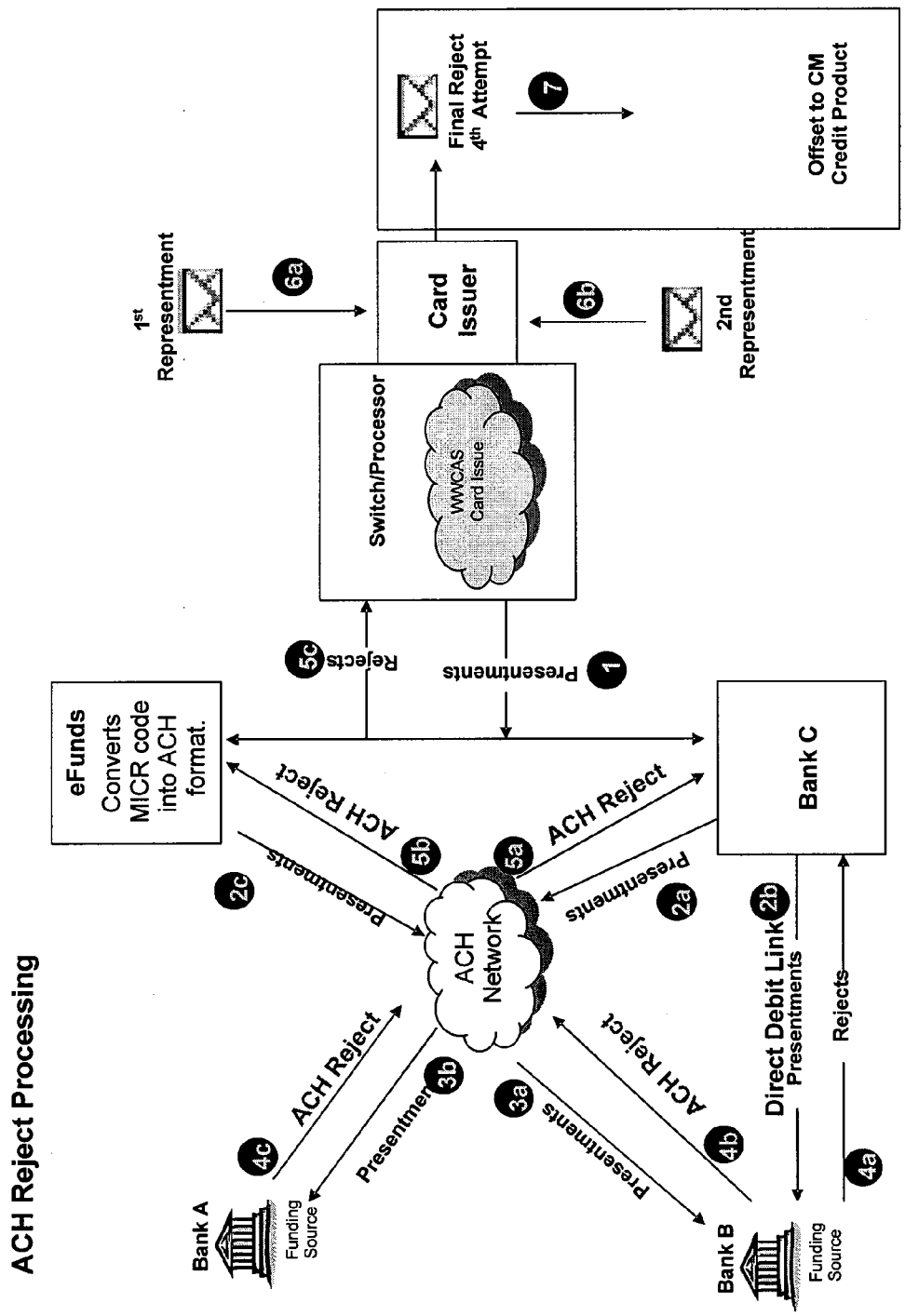
FIG. 11 pictorially shows a transaction rejection process.

FIG. 11 pictorially shows a transaction rejection process of a requested transaction. In step 1, a presentment of a requested transaction is made, possibly via a card issuer WWCAS switch/processor. The presentments can be transmitted to a Bank C and/or a third party vendor, such as eFunds. For example, eFunds can be used to convert MICR code into ACH format.

In one example, in combined or alternative steps 2a and 2b, Bank C can transmit the presentment information either directly to Bank B or to an ACH network. If sent to the ACH network, in combined or alternative steps 3a and 3b, the ACH network can transmit the presentment information to Bank A and/or Bank B. Additionally, or alternatively, in step 2c eFunds can transmit the presentment information via the ACH network to either Bank A and/or Bank B.

In one example, when step 2b has occurred, in step 4a a reject notification can be transmitted from Bank B to Bank C rejecting the transaction. In another example, when step 2a has occurred, in steps 4a, 4b, and 4c one or more rejection notifications can be transmitted from one or both of Banks A and Bank B either to the ACH Network or to Bank C rejecting the requested transaction. In a further example, when step 2c has occurred, in steps 4a, 4b, and 4c one or more rejection notifications can be transmitted from one or both of Banks A and Bank B to either the ACH Network or Bank C. If the one or more respective rejection notices from Banks A and/or B are received at the ACH Network, in steps 5a and 5b, the one or more rejection notices from the respective one or both of Bank A and/or Bank B are transmitted by the ACH Network to one or both of Bank C and eFunds.

In steps 6a and 6b, at least one or more re-presentments are made for the transaction to be accepted. In step 7, a final rejection is sent to the customer regarding the customers DDA, and an excess amount over the DDA limit is posted to the customer's overdraft account. For example, this overdraft account can be a charge or credit card of the issuing company that is issued to the customer and previously associated with the debit card.

Overview of Process

Figure 12:
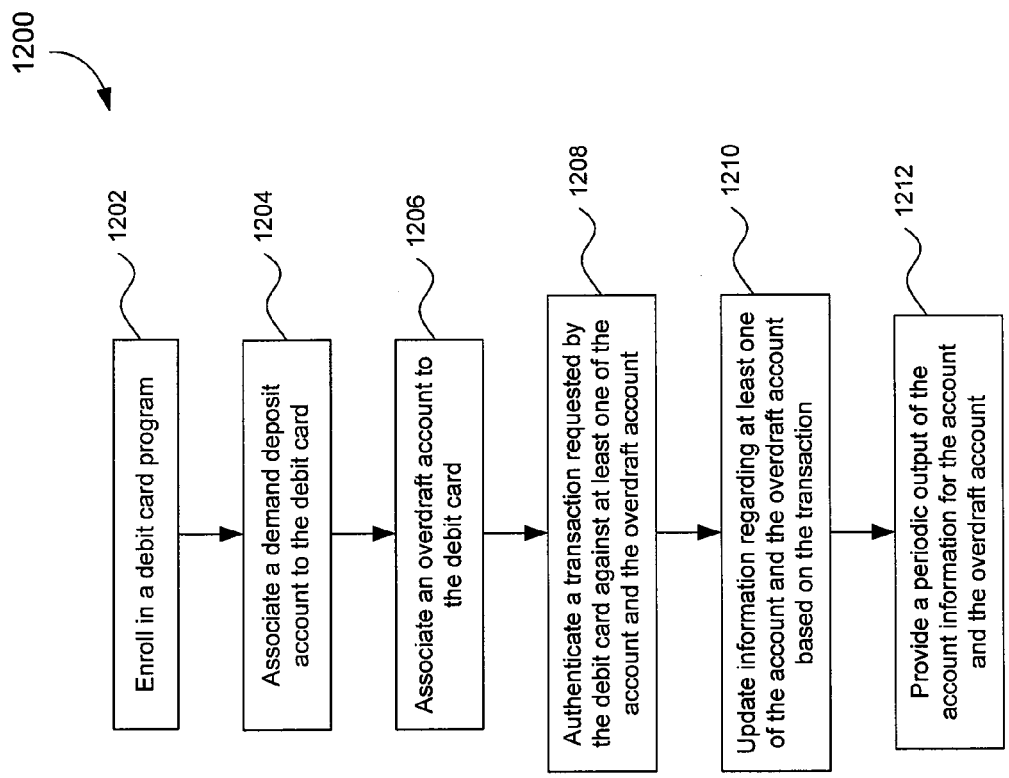
FIG. 12 shows a flowchart depicting an overall method.

FIG. 12 show a flowchart depicting an overall method 1200. In step 1202, a consumer enrolls into a debit card program and is issued a debit card. In step 1204, a DDA is associated with the debit card. In step 1206, an overdraft account is associated with the debit card. In step 1208, a transaction requested by the debit card is authenticated against at least one of the account and the overdraft account. In step 1210, information regarding at least one of the account and the overdraft account is updated based on the transaction. In step 1212, a periodic output of the account information for the account and the overdraft account is provided to the consumer.

Example Implementations

Figure 13:
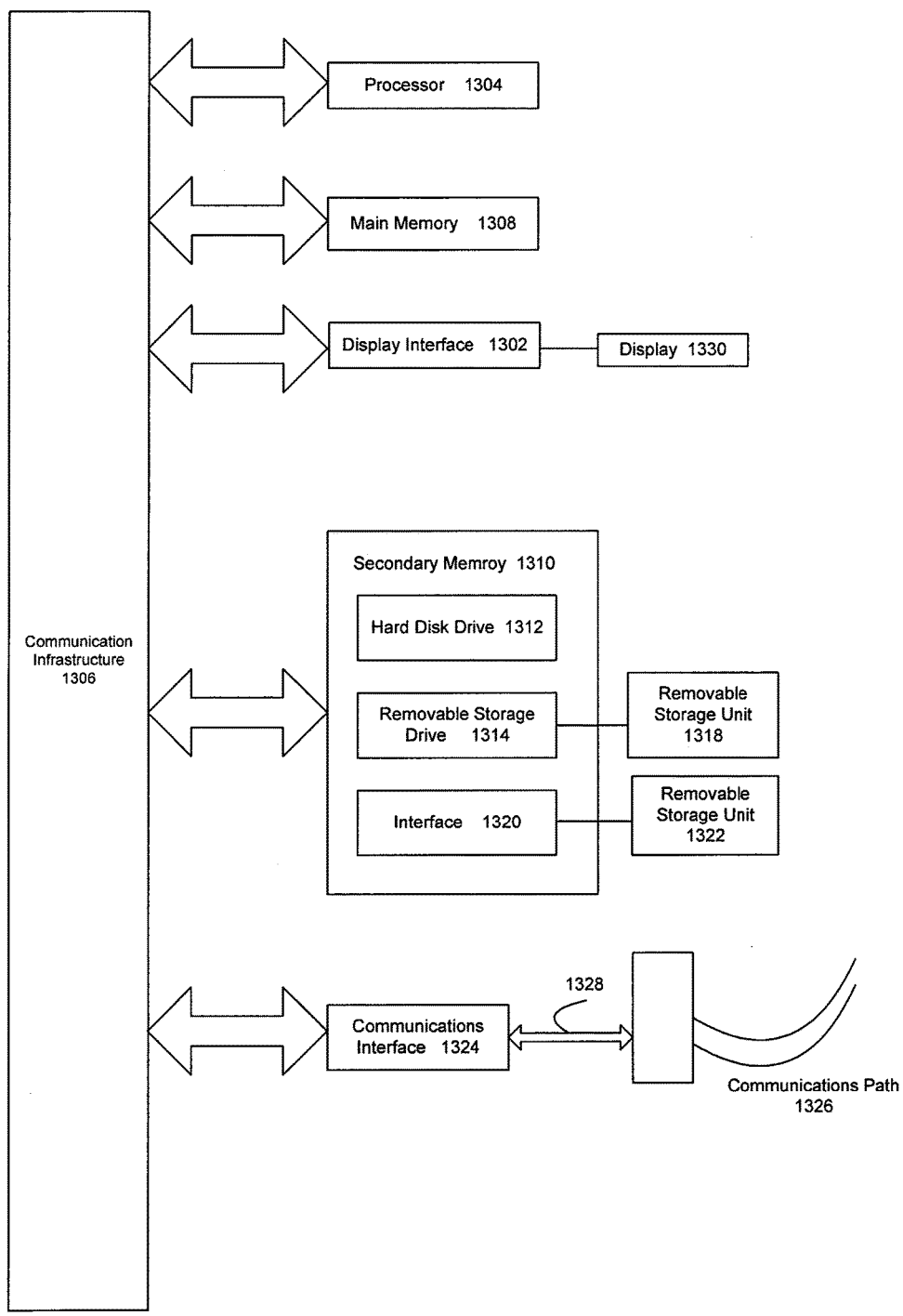
FIG. 13 is a block diagram of a sample computer system that can be used in the implementation of one or more embodiments of the present invention.

FIG. 13 is a block diagram of a sample computer system 1300 that can be used in the implementation of one or more embodiments of the present invention.

The present invention (i.e., system 100, systems and processes in FIGS. 2-12, or any part(s) or function(s)

thereof) may be implemented using hardware, software or a combination thereof and may be implemented in one or more computer systems or other processing systems. However, the manipulations performed by the present invention were often referred to in terms, such as receiving or comparing, which are commonly associated with mental operations performed by a human operator. No such capability of a human operator is necessary, or desirable in most cases, in any of the operations described herein which form part of the present invention. Rather, the operations are machine operations. Useful machines for performing the operation of the present invention include general purpose digital computers or similar devices.

In fact, in one embodiment, the invention is directed toward one or more computer systems capable of carrying out the functionality described herein. An example of a computer system 1300 is shown in FIG. 13.

The computer system 1300 includes one or more processors, such as processor 1304. The processor 1304 is connected to a communication infrastructure 1306 (e.g., a communications bus, cross-over bar, or network). Various software embodiments are described in terms of this exemplary computer system. After reading this description, it will become apparent to a person skilled in the relevant art(s) how to implement the invention using other computer systems and/or architectures.

Computer system 1300 can include a display interface 1302 that forwards graphics, text, and other data from the communication infrastructure 1306 (or from a frame buffer not shown) for display on the display unit 1330.

Computer system 1300 also includes a main memory 1308, preferably random access memory (RAM), and may also include a secondary memory 1310. The secondary memory 1310 may include, for example, a hard disk drive 1312 and/or a removable storage drive 1314, representing a floppy disk drive, a magnetic tape drive, an optical disk drive, etc. The removable storage drive 1314 reads from and/or writes to a removable storage unit 1318 in a well known manner. Removable storage unit 1318 represents a floppy disk, magnetic tape, optical disk, etc. which is read by and written to by removable storage drive 1314. As will be appreciated, the removable storage unit 1318 includes a computer usable storage medium having stored therein computer software and/or data.

In alternative embodiments, secondary memory 1310 may include other similar devices for allowing computer programs or other instructions to be loaded into computer system 1300. Such devices may include, for example, a removable storage unit 1322 and an interface 1320. Examples of such may include a program cartridge and cartridge interface (such as that found in video game devices), a removable memory chip (such as an erasable programmable read only memory (EPROM), or programmable read only memory (PROM)) and associated socket, and other removable storage units 1322 and interfaces 1320, which allow software and data to be transferred from the removable storage unit 1322 to computer system 1300.

Computer system 1300 may also include a communications interface 1324. Communications interface 1324 allows software and data to be transferred between computer system 1300 and external devices. Examples of communications interface 1324 may include a modem, a network interface (such as an Ethernet card), a communications port, a Personal Computer Memory Card International Association (PCMCIA) slot and card, etc. Software and data transferred via communications interface 1324 are in the form of signals 1328 which may be electronic, electromagnetic, optical or other signals capable of being received by communications interface 1324. These signals 1328 are provided to communications interface 1324 via a communications path (e.g., channel) 1326. This channel 1326 carries signals 1328 and may be implemented using wire or cable, fiber optics, a telephone line, a cellular link, an radio frequency (RF) link and other communications channels.

In this document, the terms "computer program medium" and "computer usable medium" are used to generally refer to media such as removable storage drive 1314, a hard disk installed in hard disk drive 1312, and signals 1328. These computer program products provide software to computer system 1300. The invention is directed to such computer program products.

Computer programs (also referred to as computer control logic) are stored in main memory 1308 and/or secondary memory 1310. Computer programs may also be received via communications interface 1324. Such computer programs, when executed, enable the computer system 1300 to perform the features of the present invention, as discussed herein. In particular, the computer programs, when executed, enable the processor 1304 to perform the features of the present invention. Accordingly, such computer programs represent controllers of the computer system 1300.

In an embodiment where the invention is implemented using software, the software may be stored in a computer program product and loaded into computer system 1300 using removable storage drive 1314, hard drive 1312 or communications interface 1324. The control logic (software), when executed by the processor 1304, causes the processor 1304 to perform the functions of the invention as described herein.

In another embodiment, the invention is implemented primarily in hardware using, for example, hardware components such as application specific integrated circuits (ASICs). Implementation of the hardware state machine so as to perform the functions described herein will be apparent to persons skilled in the relevant art(s). In yet another embodiment, the invention is implemented using a combination of both hardware and software.

Conclusion

While various embodiments of the present invention have been described above, it should be understood that they have been presented by way of example, and not limitation. It will be apparent to persons skilled in the relevant art(s) that various changes in form and detail can be made therein without departing from the spirit and scope of the present invention). Thus, the present invention should not be limited by any of the above described exemplary embodiments, but should be defined only in accordance with the following claims and their equivalents.

In addition, it should be understood that the figures and screen shots illustrated in the attachments, which highlight the functionality and advantages of the present invention, are presented for example purposes only. The architecture of the present invention is sufficiently flexible and configurable, such that it may be utilized (and navigated) in ways other than that shown in the accompanying figures.

Further, the purpose of the following Abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The Abstract is not intended to be limiting as to the scope of the present invention in any way.

What is claimed is:

1. A method, comprising:
a computer system receiving a transaction request including account information collected by a radio frequency identifier (RFID) reader configured to communicate with an RFID device, wherein the account information is for a debit account of a customer;
the computer system verifying, based on the account information, an account balance for a separate account associated with the debit account such that the separate account is debited responsive to transactions conducted via the debit account; and
the computer system determining whether to authorize the transaction request based on the verifying and without verifying an account balance of the debit account.

2. The method of claim 1, further comprising:
the computer system receiving login credentials of the customer to access an online banking service associated with the separate account; and
the computer system extracting the account balance from the online banking service by using the login credentials to sign into the online banking service.

3. The method of claim 1, wherein the separate account is debited via a debit request issued through an automated clearing house (ACH) network.

4. The method of claim 1, further comprising:
the computer system receiving a request to associate the debit account with the separate account, wherein the request includes an account number and bank routing information for the separate account; and
the computer system using, based on the determining, the account number and bank routing information to issue a request to debit the separate account for the transaction request.

5. The method of claim 1, further comprising:
the computer system associating a credit account with the debit account; and
the computer system debiting the credit account in response to an overdraft of the separate account.

6. The method of claim 1, wherein the verifying includes verifying that the account balance is sufficient to cover a value of a purchase associated with the transaction request.

7. The method of claim 1, wherein the separate account is a direct deposit account associated with a financial institution that is different from the financial institution of the debit account.

8. The method of claim 1, wherein the computer system is of a first financial institution, wherein the method further comprises:
in response to the transaction request, the computer system sending a debit request to a second financial institution to debit the separate account.

9. A method, comprising:
a radio frequency identifier (RFID) reader of a merchant system interfacing with an RFID device to read account information stored in the RFID device, wherein the account information is for a debit account of a customer;
the merchant system issuing, based on the read account information and to an authorization system, a request to conduct a transaction via the debit account, wherein the authorization system is configured to authorize the request by verifying an account balance of a separate account associated with the debit account such that the separate account is debited responsive to transactions conducted via the debit account, wherein the authorization system is configured to authorize the request without verifying an account balance of the debit account; and
the merchant system receiving an indication that the request has been authorized based on the verifying.

10. The method of claim 9, wherein the account balance is verified by presenting login credentials of a user to an online banking service that maintains the account balance for the separate account.

11. The method of claim 9, wherein authorizing the request includes verifying another account balance of an overdraft account in response to determining that the separate account has insufficient funds.

12. The method of claim 11, wherein the overdraft account is a charge account or a credit account of the customer.

13. The method of claim 9, wherein the separate account is debited via communication over an automated clearing house (ACH) network.

14. The method of claim 9, wherein the separate account is a checking account, and wherein the checking account is debited using an account number and bank routing information provided by the customer.

* * * * *